No. 852,440. PATENTED MAY 7, 1907.
C. G. P. DE LAVAL.
PROCESS OF REDUCING ZINC ORES.
APPLICATION FILED JULY 15, 1905.

Witnesses

Inventor
Carl Gustaf Patrick de Laval

Attorneys.

UNITED STATES PATENT OFFICE.

CARL GUSTAF PATRIK DE LAVAL, OF STOCKHOLM, SWEDEN, ASSIGNOR TO SOCIÉTÉ ANONYME MÉTALLURGIQUE PROCÉDÉS DE LAVAL, OF FRANKFORT-ON-THE-MAIN, GERMANY, A CORPORATION OF BELGIUM.

PROCESS OF REDUCING ZINC ORES.

No. 852,440.　　　Specification of Letters Patent.　　　Patented May 7, 1907.

Application filed July 15, 1905. Serial No. 269,756.

*To all whom it may concern:*

Be it known that I, CARL GUSTAF PATRIK DE LAVAL, engineer and doctor of philosophy, a subject of the King of Sweden, residing at Kungsträdgårdsgatan 2 C, Stockholm, Sweden, have invented new and useful Improvements in the Processes of Reducing Zinc Ores, of which the following is a specification.

The present invention refers to an improvement in the process of extracting zinc or oxid of zinc from its ores, and consists therein, that the zinc ore together with materials necessary for carrying out the reactions in question is introduced in a furnace chamber, in which the charge is subjected to a rapid rotation by means of a rapidly rotating gas or air current, during which rotation the chemical reactions are carried out.

If the zinc ore consists of un-roasted sulfid of zinc the charge is composed of sulfid of zinc, carbon and iron ore, whereas the gas current consists of carbon monoxid or air, mixed with carbon in a proportion so as to form carbon monoxid in the furnace chamber. If the sulfid of zinc is roasted iron ore need not be added. If the material to be treated consists of zinc oxid carbon is added for its reduction whereby the gas current preferably consists of carbon monoxid to avoid re-oxidation of the zinc. If zinc oxid is to be produced an air current is employed for obtaining the oxidation. The composition of the charge may be varied according to circumstances. The compositions abovementioned serve only as examples, which are not embraced in the patent protection, as the several compositions are previously known.

Figure 1:
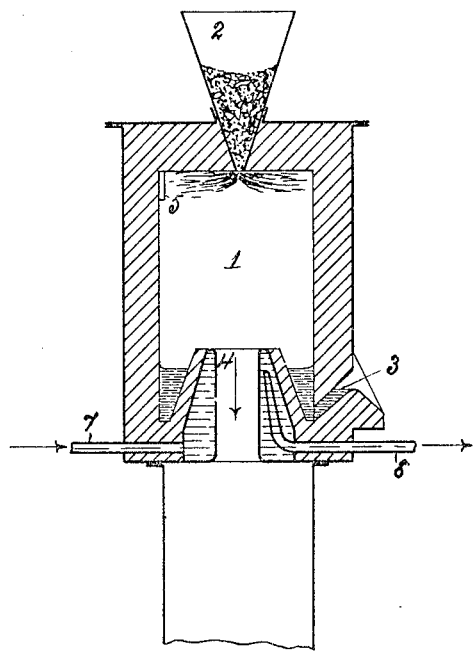
Figure 2:
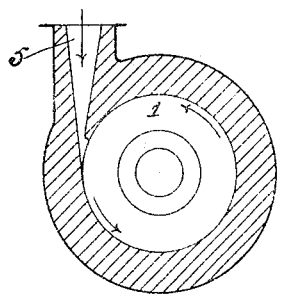

The accompanying drawing shows in Figure 1 in vertical section and in Fig. 2 in horizontal section a furnace for carrying out the process according to the present invention.

The charge is introduced continually and uniformly in the upper part of the furnace chamber, for instance through the hopper 2, whereas simultaneously carbon monoxid or air mixed with carbon in a proportion so as to form carbon monoxid within the furnace chamber is introduced tangentially and with great velocity by pressure or suction through the pipe 5. Owing to the tangential direction, in which the air or gas current is introduced the current will follow the circular furnace wall and is thus brought into a rapid rotation, which is also imparted to the charge introduced. In or near the center of the bottom of the furnace chamber is an outlet 4 for the gases developed during the process. Said gases will thus flow in a spiral direction during their way from the furnace wall, which they follow at the inlet, to the outlet in or near the central line of the furnace. The charge on the contrary is subjected to the centrifugal force during the rotation and moves from the central line of the furnace to the circumference of the same, during which motion the chemical processes are carried out. The charge and air or gas current will therefore move in opposite directions toward one another, owing to which the processes are carried out rapidly and completely.

The crude ore and slag produced during the process gather on the furnace wall and flow down to the lower part of the furnace, from which they are drawn off through the outlet 3. The developed zinc gases or the zinc oxid fume follow the gases out through the outlet 4 and are condensed or gathered in any convenient manner. In the construction shown on the drawing the outlet is formed with a hollow wall and which is cooled by means of a water current circulating through the pipes 7 and 8.

Having now particularly described and ascertained the nature of the said invention and in what manner the same is to be performed I declare that what I claim is:—

1. The process of reducing zinc ores which consists in subjecting a pulverous charge containing the zinc ore mixed with materials necessary for carrying out the chemical reactions in a suitable furnace to a rapid rotating or whirling motion produced by means of a current of gas.

2. The process of reducing zinc ores which consists in subjecting a pulverous charge containing zinc ore mixed with materials necessary for carrying out the chemical reactions to a rapid rotating or whirling motion in a furnace by means of a tangentially introduced current of gas.

3. The herein described process of reducing zinc ores which consists in feeding a pulverized charge of zinc ore mixed with the materials necessary for carrying out the chemical reactions, and subjecting it to a rapid rotary motion produced by a current of gas applied in a plane substantially at right angles to the line of feed, substantially as described.

4. The process of reducing zinc ores, which consists in subjecting a pulverous charge containing zinc ore to a rapid rotating or whirling motion in a furnace, by means of an air current, mixed with carbon so as to form carbon monoxid, substantially as described.

In testimony whereof I have signed my name to this specification in the presence of two subscribing witnesses.

CARL GUSTAF PATRIK DE LAVAL.

Witnesses:
WALDEMAR BOMAN,
CARL LUBERG.